United States Patent
Lee et al.

(10) Patent No.: US 8,218,761 B2
(45) Date of Patent: Jul. 10, 2012

(54) METHOD AND APPARATUS FOR GENERATING RANDOM DATA-ENCRYPTION KEYS

(75) Inventors: Adam Y. Lee, San Jose, CA (US); Paul Youn, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1063 days.

(21) Appl. No.: 11/784,457

(22) Filed: Apr. 6, 2007

(65) Prior Publication Data

US 2010/0008499 A1    Jan. 14, 2010

(51) Int. Cl.
*H04L 9/00* (2006.01)
*H04L 9/32* (2006.01)

(52) U.S. Cl. .......................................... 380/46; 713/180
(58) Field of Classification Search .................... 380/46; 713/180

See application file for complete search history.

(56) References Cited

U.S. PATENT DOCUMENTS

| | | | | |
|---|---|---|---|---|
| 4,203,166 A | * | 5/1980 | Ehrsam et al. | 380/45 |
| 5,995,625 A | * | 11/1999 | Sudia et al. | 705/51 |
| 6,028,933 A | * | 2/2000 | Heer et al. | 713/169 |
| 7,010,124 B1 | * | 3/2006 | Ishiguro et al. | 380/201 |
| 7,106,862 B1 | * | 9/2006 | Blair et al. | 380/256 |
| 7,356,692 B2 | * | 4/2008 | Bialick et al. | 713/156 |
| 7,672,455 B2 | * | 3/2010 | Kurdziel | 380/259 |
| 2002/0095589 A1 | * | 7/2002 | Keech | 713/189 |
| 2003/0002663 A1 | * | 1/2003 | Kurdziel | 380/37 |
| 2004/0091114 A1 | * | 5/2004 | Carter et al. | 380/259 |
| 2004/0168055 A1 | * | 8/2004 | Lord et al. | 713/156 |
| 2005/0060561 A1 | * | 3/2005 | Pearson et al. | 713/194 |
| 2005/0060568 A1 | * | 3/2005 | Beresnevichiene et al. | 713/200 |
| 2005/0076237 A1 | * | 4/2005 | Cohen et al. | 713/201 |
| 2006/0075258 A1 | * | 4/2006 | Adamson et al. | 713/189 |
| 2006/0179309 A1 | * | 8/2006 | Cross et al. | 713/168 |
| 2007/0050620 A1 | * | 3/2007 | Pham et al. | 713/165 |
| 2007/0201721 A1 | * | 8/2007 | Malone et al. | 382/100 |
| 2007/0208952 A1 | * | 9/2007 | Nation et al. | 713/190 |

* cited by examiner

*Primary Examiner* — Techane Gergiso
(74) *Attorney, Agent, or Firm* — Shun Yao; Park, Vaughan, Fleming & Dowler LLP

(57) ABSTRACT

One embodiment of the present invention provides a system that facilitates generating random data-encryption keys for data files. During operation, the system receives a command at a computer system to create a data file that may include encrypted data. This data file includes a wrapped data-encryption key to facilitate encrypting and decrypting data. In response to the command, the system generates a bit pattern to be used as the wrapped data-encryption key. Finally, the system creates the data file, which includes the bit pattern as the wrapped data-encryption key.

15 Claims, 3 Drawing Sheets

METHOD AND APPARATUS FOR GENERATING RANDOM DATA-ENCRYPTION KEYS

BACKGROUND

1. Field of the Invention

The present invention relates to databases. More specifically, the present invention relates to a method and an apparatus for generating random data-encryption keys for database log files.

2. Related Art

Many database systems use encryption to secure data against unauthorized use. Typically, this involves encrypting the data that the database is managing, as well as encrypting system log files that record the transactions performed on the database.

For various reasons, a copy of the secret key which is used to encrypt and decrypt data within the log files is typically stored in the header of the log file. In order to prevent someone who obtains a copy of the log file from decrypting the data, a key-encryption key, which is not stored with the log file, is typically used to wrap (encrypt) the secret key. Hence, in order to decrypt data in the log file, the wrapped secret key must first be unwrapped by using the key-encryption key.

However, wrapping the secret key at log file creation time can be problematic. It typically requires a large amount of resources to wrap the secret key with the key-encryption key. Furthermore, in many cases, databases systems are installed and configured by third-parties before being sent to end-users. These third parties typically do not have access to the end-user's key-encryption keys. This is especially problematic with regards to sequential-access storage mediums and write-once storage mediums.

Hence, what is needed is a method and apparatus for creating wrapped secret keys without the problems listed above.

SUMMARY

One embodiment of the present invention provides a system that facilitates generating random data-encryption keys for data files. During operation, the system receives a command at a computer system to create a data file that may include encrypted data. This data file includes a wrapped data-encryption key to facilitate encrypting and decrypting data. In response to the command, the system generates a bit pattern to be used as the wrapped data-encryption key. Finally, the system creates the data file, which includes the bit pattern as the wrapped data-encryption key.

In some embodiments of the present invention, the system receives a second command at the computer system to perform a cryptographic operation on the data in the data file. This cryptographic operation can involve encrypting the data or decrypting the data. In response to the command, the system unwraps a copy of the wrapped data-encryption key with a key-encryption key to reveal a data-encryption key. Finally, the system uses the data-encryption key to perform the cryptographic operation on the data.

In some embodiments of the present invention, the key-encryption key is a symmetric key. In some embodiments of the present invention, the key-encryption key is stored externally to the computer system.

In some embodiments of the present invention, the computer system is a data storage system.

In some embodiments of the present invention, the data file is a log file.

In some embodiments of the present invention, generating the bit pattern involves randomly generating the bit pattern.

In some embodiments of the present invention, the data file is stored on a sequential-access storage medium.

In some embodiments of the present invention, the wrapped data-encryption key is stored in a header of the data file.

In some embodiments of the present invention, the data file is partially or selectively encrypted.

In some embodiments of the present invention, the wrapped data-encryption key is used to encrypt and/or decrypt data in a secured streaming socket connection.

In some embodiments of the present invention, the bit pattern is restricted to a predetermined range to accommodate any restraints that may exist due to the usage of a specific type of key-encryption key, such as if the key-encryption key has a restricted output range.

In some embodiments of the present invention, the system further comprises post-processing the bit pattern after generating or unwrapping the wrapped data-encryption key to create a valid key. For example, the system may post process the bit pattern to create a valid Data Encryption Standard (DES) key.

DETAILED DESCRIPTION

Figure 1:
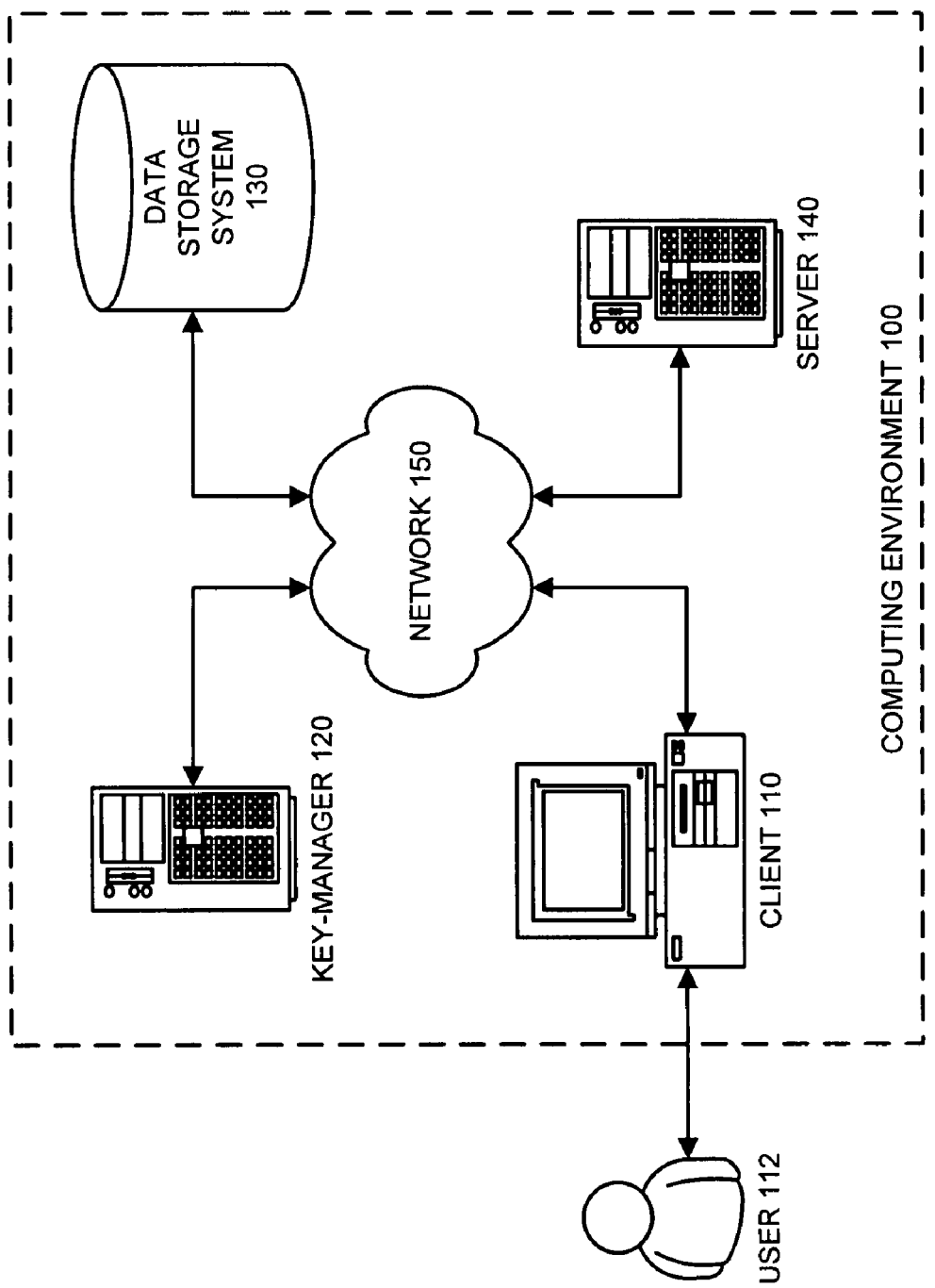
FIG. 1 illustrates a computing environment 100 in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a system that facilitates generating random data-encryption keys for data files. During operation, the system receives a command at a computer system to create a data file that may or may not include encrypted data. Note that the data file includes a wrapped data-encryption key to facilitate encrypting and decrypting data. In response to the command, the system generates a bit pattern to be used as the wrapped data-encryption key. Finally, the system creates the data file, which includes the bit pattern as the wrapped data-encryption key.

In some embodiments of the present invention, the system receives a second command at the computer system to perform a cryptographic operation on the data in the data file. Note that the cryptographic operation can include encrypting the data or decrypting the data. In response to the command, the system unwraps a copy of the wrapped data-encryption key with a key-encryption key to reveal a data-encryption key. Finally, the system uses the data-encryption key to perform the cryptographic operation on the data.

Because of the 1-to-1 mapping property of symmetric encryption/decryption routines, any given plain text maps to one particular cipher text. It is equally challenging to find a plain text for a cipher text as it is to find a cipher text for a plain text without the knowledge of the secret key. Therefore, instead of generating a random plain text key and encrypting the random plain text key right away with a key-encryption key, one could generate a random "wrapped" key, and store the random "wrapped" key on a disk or send the random "wrapped" key to a peer immediately without accessing the key-encryption key. Only when the secret key actually needs to be used does the system need to retrieve the key-encryption key and "unwrap" the pre-generated wrapped key to obtain a "plain text" key for encryption/decryption purposes.

Depending on the encryption algorithm used to wrap/unwrap the key, concerns can arise that the output of decryption for the "unwrapped" key is not a uniformly random key value, and a uniformly random key value is considered more secure. However this potential problem could be solved by applying a secure hash on output of the decryption to make the key a uniformly random "unwrapped" key, as the output of secure hash will be uniformly random.

Note that this system postpones access to the key-encryption key until the time when the secret key is actually needed, and therefore this system removes the dependency of the key-encryption key from the generation of the secret key. For example, in a Relational DataBase Management System (RDBMS) environment, the data-encryption key could be pre-generated ahead of time and stored to disk immediately, without the need for accessing the key-encryption key. This can be highly desirable since the key-encryption key typically exists in a security module outside of the RDBMS.

Furthermore, most logs do not include encrypted information and there is no need to access the key-encryption key to wrap the data-encryption key for most logs. The key-encryption key is only needed at the time of log generation when data has to be encrypted immediately.

In some embodiments of the present invention, the key-encryption key is a symmetric key. In some embodiments of the present invention, the key-encryption key is stored externally to the computer system. Note that key-encryption keys are typically stored in an External Security Module, such as a Hardware Security Module.

In some embodiments of the present invention, a key management server handles all of the key wrapping and unwrapping. Since the initial encryption of the key is delayed (and potentially skipped), performance benefits can be obtained due to the reduce load on the key management server.

In some embodiments of the present invention, the computer system is a data storage system. This can include a database, as well as an RDBMS.

In some embodiments of the present invention, the data file is stored on a sequential-access storage medium, such as a tape. Note that it can be problematic to modify data already stored to the sequential-access storage medium. If a system that uses a sequential-access storage medium requires a data-encryption key to be stored in the header of a data file, such as a log file, it can be very problematic to modify the header of the data file after the data file has been created and has been populated with some data, because it would require the sequential-access storage medium controller to seek back to the position of the header on the sequential-access storage medium. Furthermore, the data-encryption key might not fit within the pre-written header.

In some embodiments of the present invention, the bit pattern is restricted to a predetermined range to accommodate any restraints that may exist due to the usage of a specific type of key-encryption key, such as if the key-encryption key has a restricted output range.

In some embodiments of the present invention, the system further comprises post-processing the bit pattern after generating or unwrapping the wrapped data-encryption key to create a valid key. For example, the system may post process the bit pattern to create a valid Data Encryption Standard (DES) key.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes client 110, key-manager 120, data storage system 130, server 140, and network 150.

Client 110 can generally include any node on a network including computational capability and including a mechanism for communicating across the network.

Key-manager 120 can generally include any system for managing cryptographic keys. In one embodiment of the present invention, data storage system 130, or server 140 can include key-manager 120.

In one embodiment of the present invention, key-manager 120 can be an external security module.

In one embodiment of the present invention, key-manager 120 can communicate directly (i.e., not via network 150 or any other intermediary system) with data storage system 130 and/or server 140.

An external security module can generally include any physical or logical device created to be highly resistant to unauthorized access. A physical external security module (ESM) is referred to as a "hardware security module" (HSM). In an HSM, all sensitive data is stored in a separate physical storage device with its own access control policies. The physical storage device along with associated software interfaces are usually certified or tested against both physical and software-based intrusion attempts.

Data storage system 130 can generally include any type of data storage system, or system for storing data in non-volatile storage. This includes, but is not limited to, systems based upon magnetic, optical, and magneto-optical storage devices, as well as storage devices based on flash memory and/or battery-backed up memory.

In one embodiment of the present invention, data storage system 130 can be a database.

In one embodiment of the present invention, data storage system 130 can be a file system. In this embodiment, a subset of storage can be a directory or set of directories.

Server 140 can generally include any computational node including a mechanism for servicing requests from a client for computational and/or data storage resources.

Network 150 can generally include any type of wired or wireless communication channel capable of coupling together computing nodes. This includes, but is not limited to, a local area network, a wide area network, or a combination of networks. In one embodiment of the present invention, network 150 includes the Internet.

Timeline for Log File Use

Figure 2:
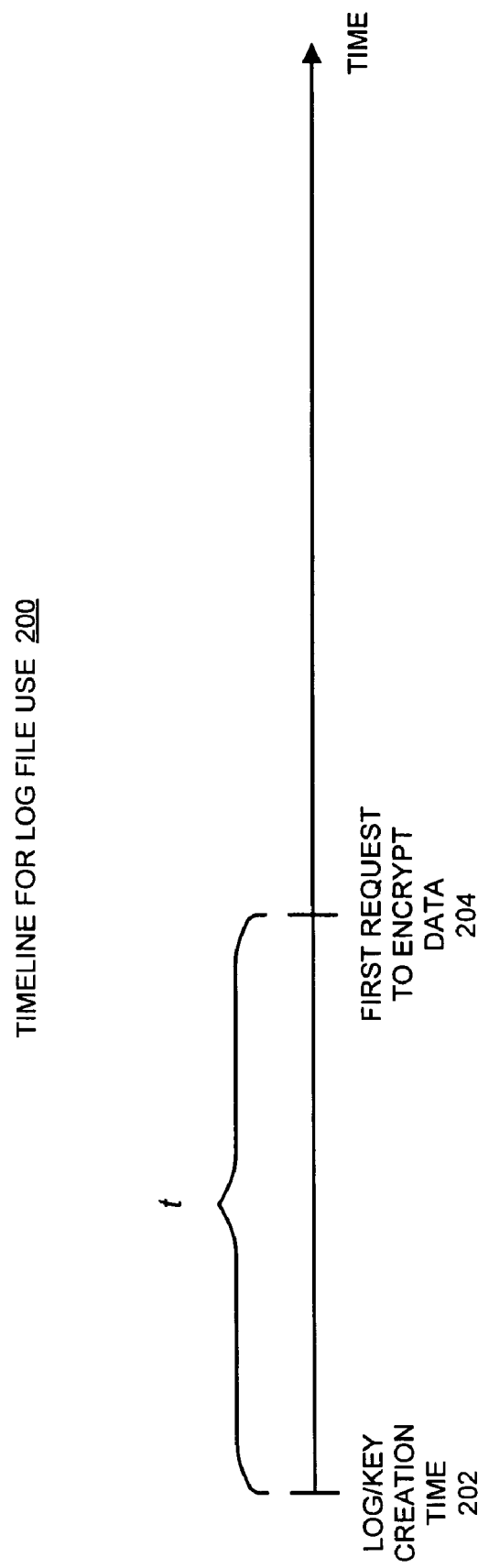
FIG. 2 illustrates a timeline for log file use in accordance with an embodiment of the present invention.

FIG. 2 illustrates a timeline for log file use 200 in accordance with an embodiment of the present invention.

Log/key creation time 202 is the initial moment when a data file and a corresponding data-encryption key are established for data storage system 130. In one embodiment of the present invention, the data file is a database log file and data storage system 130 is a database. At this point in time, data storage system 130 generates a random bit string and places the random bit string into the header of the data file as a wrapped data-encryption key. Note that this is done without the use of a key-encryption key.

After some period of time t, data storage system 130 receives a first request to encrypt in the data file. This is represented by first request to encrypt data 204. Note that first request to encrypt data 204 is the first time that the key-encryption key is actually needed. Because of the resource requirements needed to wrap or unwrap the data-encryption key with the key-encryption key, one embodiment of the present invention eliminates this resource requirement at log/key creation time 202, and the first use of the key-encryption key is delayed until the first request to encrypt data 204, after time t has elapsed.

Note that in some embodiments of the present invention, the first request to encrypt data 204 never occurs. Note that some data files never include any encrypted data, and therefore never have the need to use the wrapped data-encryption key. In this case, the overhead of using the key-encryption key is never incurred, because use of the key-encryption key is unnecessary.

Generating a Random Data-Encryption Key

Figure 3:
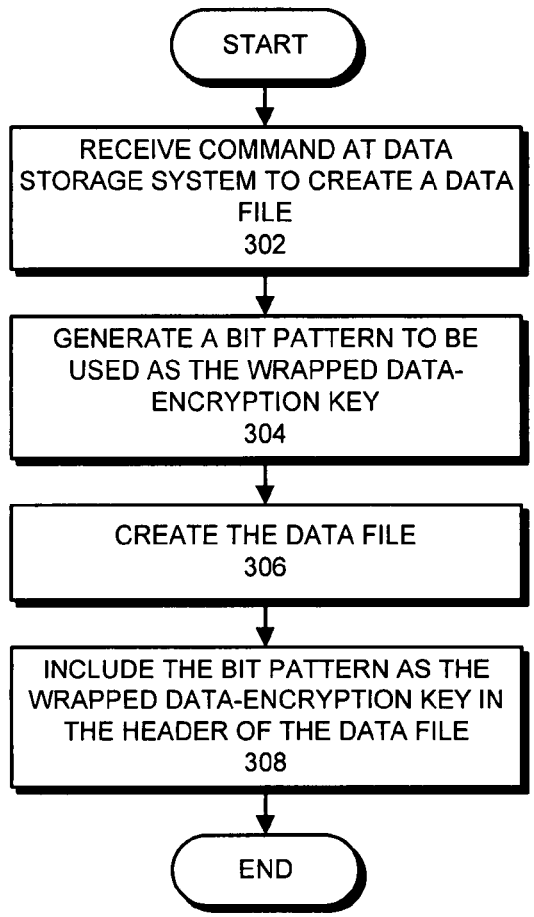
FIG. 3 presents a flowchart illustrating the process of generating a random data-encryption key for a data file in accordance with an embodiment of the present invention.

FIG. 3 presents a flowchart illustrating the process of generating a random data-encryption key for a data file in accordance with an embodiment of the present invention.

The system operates by receives a command at a data storage system 130 to create a data file (operation 302) that may or may not include encrypted data. In response to the command, data storage system 130 generates a bit pattern to be used as the wrapped data-encryption key (operation 304). Finally, data storage system 130 creates the data file (operation 306), and includes the bit pattern as the wrapped data-encryption key in the header of the data file (operation 308).

Encrypting Data within a Data File

Figure 4:
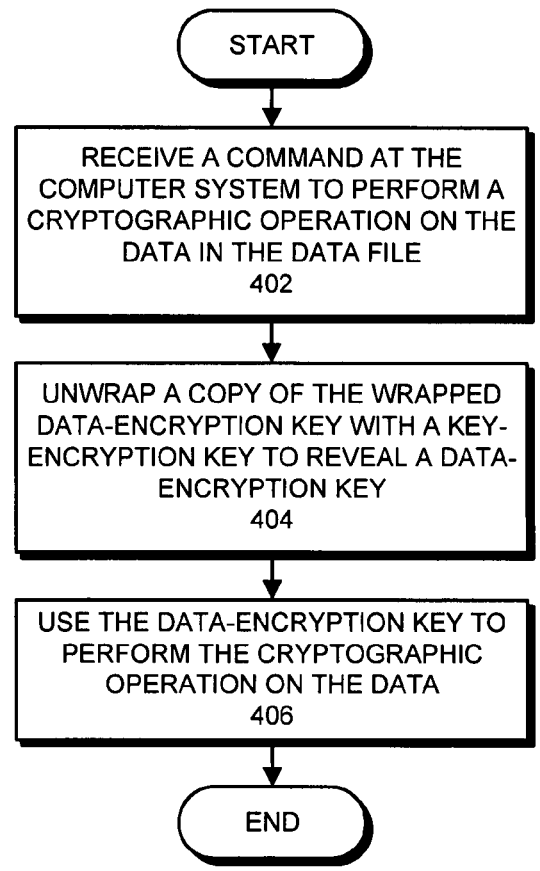
FIG. 4 presents a flowchart illustrating the process of encrypting data within a data file in accordance with an embodiment of the present invention.

FIG. 4 presents a flowchart illustrating the process of encrypting data within a data file in accordance with an embodiment of the present invention.

In one embodiment of the present invention, data storage system 130 receives a command at the computer system to perform a cryptographic operation on the data in the data file (operation 402). Note that the cryptographic operation can include encrypting the data or decrypting the data. Note that the first cryptographic operation is encrypting data, because until data is encrypted the first time, there is no data to decrypt.

In response to the command, data storage system 130 unwraps a copy of the wrapped data-encryption key with a key-encryption key to reveal a data-encryption key (operation 404). Note that this can be accomplished in various ways. In one embodiment of the present invention, data storage system 130 passes the wrapped data-encryption key to a Hardware Security Module (HSM), and the HSM unwraps the wrapped data-encryption key with the key-encryption key to obtain the data-encryption key, and then passes the data-encryption key back to data storage system 130. In some embodiments of the present invention, data storage system 130 obtains the key-encryption key and uses the key-encryption key to unwrap the wrapped data-encryption key within data storage system 130.

Finally, data storage system 130 uses the data-encryption key to perform the cryptographic operation on the data (operation 406).

SUMMARY

As described previously, one embodiment of the present invention provides a system, such as data storage system 130, that facilitates generating random data-encryption keys for data files. During operation, data storage system 130 receives a command at a computer system to create a data file, such as a log file, that may or may not include encrypted data. Note that the data file includes a wrapped data-encryption key to facilitate encrypting and decrypting data. In response to the command, data storage system 130 generates a bit pattern to be used as the wrapped data-encryption key. Finally, data storage system 130 creates the data file, which includes the bit pattern as the wrapped data-encryption key.

Some embodiments of the present invention pre-generate the wrapped data-encryption key and delay access to the key-encryption key to reduce or eliminate the resources needed during the initial setup and configuration of data storage system 130. In many cases, it is not feasible to cache the data-encryption key until usage time, and the wrapped data-encryption key has to be unwrapped with the key-encryption key at first use. In this way, the overhead of initial wrapping the data-encryption key is saved, and any potential delays or resource penalties occurred from using the key-encryption key are avoided.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a data-encryption key, the method comprising:

receiving, by a processor, a first command to create a log file;

generating, by the processor, a random bit pattern without accessing the key-encryption key;

including the generated random bit pattern within the log file created in response to the first command;

receiving a second command to perform a cryptographic operation on the log file;

obtaining the key-encryption key;

generating the data-encryption key from the random bit pattern included within the log file by using the key-encryption key to decrypt the random bit pattern; and performing the cryptographic operation on the log file using the data-encryption key generated from the random bit pattern included within the log file.

2. The method of claim 1, wherein the cryptographic operation includes encrypting data in the log file.

3. The method of claim 1, wherein the key-encryption key is a symmetric key.

4. The method of claim 1, wherein the data file is stored on a sequential-access storage medium, or transferred to a third-party via a secured streaming socket connection.

5. The method of claim 1, wherein the generated random bit pattern is stored in a header of the log file.

6. A non-transitory computer-readable storage medium storing instructions that when executed by a computer cause the computer to perform a method for generating a data-encryption key, the method comprising:
- receiving, by a processor, a first command to create a log file;
- generating, by the processor, a random bit pattern without accessing the key-encryption key, in response to the first command;
- including the generated random bit pattern within the log file created in response to the first command;
- receiving a second command to perform a cryptographic operation on the log file;
- obtaining the key-encryption key;
- generating the data-encryption key from the random bit pattern included within the data file by using the key-encryption key to decrypt the random bit pattern; and
- performing the cryptographic operation on the log file using the data-encryption key generated from the random bit pattern included within the log file.

7. The non-transitory computer-readable storage medium of claim 6, wherein the cryptographic operation includes encrypting data in the log file.

8. The non-transitory computer-readable storage medium of claim 6, wherein the key-encryption key is a symmetric key.

9. The non-transitory computer-readable storage medium of claim 6, wherein the log file is stored on a sequential-access storage medium, or transferred to a third-party via a secured streaming socket connection.

10. The non-transitory computer-readable storage medium of claim 6, wherein the generated random bit pattern is stored in a header of the log file.

11. An apparatus configured for generating a data-encryption key, comprising:
- a processor;
- a storage device coupled to the processor;
- a receiving mechanism coupled to the processor and configured to receive a first command to create a log file and a second command to perform a cryptographic operation on the log file;
- a bit-pattern generation mechanism coupled to the processor and configured to generate, in response to the first command, a random bit pattern without accessing the key-encryption key;
- an inclusion mechanism coupled to the processor and configured to include the generated random bit pattern within the log file created in response to the first command;
- a key-generation mechanism configured to:
  - obtain the key-encryption key; and
  - generate the data-encryption key from the random bit pattern included within the log file by using the key-encryption key to decrypt the random bit pattern, in response to the second command; and
- a cryptographic mechanism configured to perform the cryptographic operation on the data file using the data-encryption key generated from the random bit pattern included within the log file.

12. The apparatus of claim 11, wherein the cryptographic operation includes encrypting data in the log file.

13. The apparatus of claim 11, wherein the key-encryption key is a symmetric key.

14. The apparatus of claim 11, wherein the data file is stored on a sequential-access storage medium, or transferred to a third-party via a secured streaming socket connection.

15. The apparatus of claim 11, wherein the generated random bit pattern is stored in a header of the log file.

* * * * *